(12) United States Patent
Knittel et al.

(10) Patent No.: US 9,243,577 B2
(45) Date of Patent: Jan. 26, 2016

(54) SENSOR FOR DETECTING THE MASS FLOW RATE AND THE TEMPERATURE OF A FLUID FLOW

(71) Applicants: Thorsten Knittel, Pentling (DE); Stephan Schürer, Regensburg (DE)

(72) Inventors: Thorsten Knittel, Pentling (DE); Stephan Schürer, Regensburg (DE)

(73) Assignee: Continental Automotive GmbH, Hannover (DE)

( * ) Notice: Subject to any disclaimer, the term of this patent is extended or adjusted under 35 U.S.C. 154(b) by 46 days.

(21) Appl. No.: 14/364,554

(22) PCT Filed: Dec. 14, 2012

(86) PCT No.: PCT/EP2012/075509
§ 371 (c)(1),
(2) Date: Jun. 11, 2014

(87) PCT Pub. No.: WO2013/087824
PCT Pub. Date: Jun. 20, 2013

(65) Prior Publication Data
US 2014/0366614 A1 Dec. 18, 2014

(30) Foreign Application Priority Data
Dec. 16, 2011 (DE) .......................... 10 2011 088 902

(51) Int. Cl.
*G01F 1/68* (2006.01)
*F02D 41/18* (2006.01)
(Continued)

(52) U.S. Cl.
CPC ................ *F02D 41/18* (2013.01); *G01D 21/02* (2013.01); *G01F 1/6845* (2013.01); *G01F 1/696* (2013.01); *G01M 15/042* (2013.01); *G01K 2205/02* (2013.01)

(58) Field of Classification Search
USPC ............. 73/861.44, 861.356, 204.26, 861.01; 123/478; 137/487.5
See application file for complete search history.

(56) References Cited

U.S. PATENT DOCUMENTS 4,807,151 A * 2/1989 Citron .................... G01F 1/698
 123/494
5,606,513 A * 2/1997 Louwagie ............... G01F 1/363
 702/138

(Continued)

FOREIGN PATENT DOCUMENTS

WO WO 2004/090679 A2 4/2004

OTHER PUBLICATIONS

Bosch, "Kraftfahrtechnisches Taschenbuch", 26. Auflage, Friedr. Vieweg & Sohn Verlag, Wiesbaden, 2007, Sejten 112, 113, 149-151.

(Continued)

Primary Examiner — Jewel V Thompson
(74) Attorney, Agent, or Firm — Cozen O'Connor (57) ABSTRACT

A sensor for detecting the mass flow rate and the temperature of a fluid flow has a mass flow rate sensor having a mass flow rate sensor element, a temperature sensor having a temperature sensor element, and an interface for power supply. The sensor converts the measured values detected in analog by the mass flow rate sensor element and the temperature sensor element into digital output signals. In order to specify the simplest and most economical sensor possible for detecting the mass flow rate and the temperature of a fluid flow, at least one analog/digital converter is arranged in the sensor, which analog/digital converter converts the analog measured values of the mass flow rate sensor element and/or the analog measured value of the temperature sensor element into digital output signals and provides the digital output signals at a single digital interface.

9 Claims, 5 Drawing Sheets

(51) Int. Cl.
*G01D 21/02* (2006.01)
*G01F 1/684* (2006.01)
*G01F 1/696* (2006.01)
*G01M 15/04* (2006.01)

(56) References Cited

U.S. PATENT DOCUMENTS

| | | | | |
|---|---|---|---|---|
| 6,073,495 | A * | 6/2000 | Stadler | G01F 1/8409 73/32 A |
| 6,253,624 | B1 * | 7/2001 | Broden | G01F 1/50 73/861.44 |
| 6,575,027 | B1 * | 6/2003 | Larsen | G01F 1/696 73/204.15 |
| 6,868,862 | B2 * | 3/2005 | Shajii | G01F 1/667 137/486 |
| 7,536,908 | B2 * | 5/2009 | Wang | G01F 1/6845 73/204.15 |
| 7,651,263 | B2 * | 1/2010 | Zolock | G01K 13/02 374/1 |
| 7,908,096 | B2 * | 3/2011 | Wang | G01F 1/6845 702/45 |
| 2002/0108603 | A1 * | 8/2002 | Wienand | F02B 37/225 123/478 |

OTHER PUBLICATIONS

Schiffer, "Entwurf and Bewertung eines Systems zur Datenubertragung mittels der Energieversorgungsieitungen im Kraftfahrzeug. Promotion an der TU Munchen", Nov. 2001 (6 pages).
Luftmassenmesser. Nov. 21, 2011, Wikipedia. Retrieved from http.7/de.wikipedia.org/w/index.php?title=Luftmassenmesser&oldid=96251325.

* cited by examiner

SENSOR FOR DETECTING THE MASS FLOW RATE AND THE TEMPERATURE OF A FLUID FLOW

CROSS-REFERENCE TO RELATED APPLICATIONS

This is a U.S. national stage of application No. PCT/EP2012/075509, filed on 14 Dec. 2012, which claims priority to the German Application No. 10 2011 088 902.7, filed 16 Dec. 2011, the content of both incorporated herein by reference.

BACKGROUND OF THE INVENTION

1. Field of the Invention

The invention relates to a sensor for detecting the mass flow rate and the temperature of a fluid flow, wherein the sensor comprises a mass flow rate sensor having a mass flow rate sensor element and a temperature sensor having a temperature sensor element and also an interface for the power supply, wherein the sensor converts the measured values that are detected in an analog manner by the mass flow rate sensor element and the temperature sensor element into digital output signals.

2. Related Art

The process of detecting the mass flow rate and the temperature of a fluid flow is very important, in particular in the automotive industry, since these measurements are necessary for the purpose of controlling combustion engines in motor vehicles in an optimal manner. Hitherto, the values that are determined by sensors for the purpose of detecting the mass flow rate and the temperature of a fluid flow to the engine control unit were provided in the automobile in analog form. However, analog signals have the disadvantage that they are prone to interference and for example can be considerably degraded as a result of electromagnetic interference fields. It is advantageous to digitize the analog measured values that are determined by the sensor in the sensor itself. This is performed with analog/digital converters that can be arranged in the sensor itself. Since the sensor detects multiple physical measurements for the purpose of detecting the mass flow rate and the temperature, a multiplicity of analog/digital converters are necessary. Furthermore, a multiplicity of interfaces and power supplies are necessary on and/or in the sensor for the purpose of detecting the mass flow rate and the temperature of a fluid flow in order to operate and to read the individual sensor elements. As a consequence, the process of detecting the measured values for the mass flow rate and the temperature within a fluid flow becomes relatively complex and expensive.

SUMMARY OF THE INVENTION

An object of the invention is therefore to provide a sensor that is as simple and cost-effective as possible for the purpose of detecting the mass flow rate and the temperature of a fluid flow.

This object is achieved in accordance with an aspect of the invention by the features described herein. By virtue of the fact that at least one analog/digital converter is arranged in the sensor and the analog/digital converter converts the analog measured values of the mass flow rate sensor element and/or the analog measured value of the temperature sensor element into a digital output signal and provides the digital output signals at a single digital interface, at least one line that connects the sensor to a engine control unit that is arranged downstream is omitted. Therefore, only one single line is necessary in order to convey the measured values of the mass flow rate sensor element and the measured values of the temperature sensor element to the motor control. Since, in the case of modern sensors, the wiring represents a significant part of the total price of the sensor, the sensor in accordance with the invention can be produced in a particularly inexpensive manner. Furthermore, the sensor in accordance with the invention can be produced in a manner that is particularly error-free and is not sensitive to interference since all of the fundamental functions for the purpose of measuring the temperature and the mass flow rate are combined in the sensor itself and the complete digitized measurement results of the mass flow rate sensor element and the temperature sensor element are only transmitted by way of a single digital interface and a single line to the motor control.

In the case of one embodiment of the invention, a moisture sensor/moisture sensors having a moisture sensor element and or a pressure sensor having a pressure sensor element is/are arranged in the sensor in addition to the mass flow rate sensor and the temperature sensor. Both the moisture sensor and also the pressure sensor are suitable for modifying the signals of the sensor for detecting the mass flow rate and the temperature in order to compensate for changing measurements in the intake air. The mass flow rate signal informs the engine control unit of the amount of oxygen that is available for the purpose of combusting the fuel and the amount of oxygen is naturally primarily dependent upon the mass flow rate of the intake air. However, in the case of a uniform mass flow rate, the prevailing pressure, the moisture of the incoming air and the temperature of the incoming air can lead to a non-uniform delivery of oxygen to the combustion chambers of the combustion engine. The physical measurements temperature, air moisture and pressure are therefore suitable in order to achieve an error compensation of the mass flow rate signal and to render it possible to deliver a highly accurate dose of fuel into the combustion chambers. This is used to preserve resources and the environment.

Since at least one analog/digital converter is arranged in the sensor and the converter converts the analog measured values of the mass flow rate sensor element and the analog measured values of the temperature sensor element into a digital output signal and provides the signals at a single digital interface, the sensor can be produced in a less complex and more cost-effective manner. As a result of omitting at least one line between the sensor and the control unit, the total weight of the vehicle in which the sensor in accordance with the invention is constructed is reduced.

In the case of an advantageous development, the at least one analog/digital converter is arranged in the mass flow rate sensor. In addition, it is feasible that at least one analog/digital converter is arranged in the temperature sensor and/or in the moisture sensor and/or in the pressure sensor. The at least one analog/digital converter can convert the analog measured values of the mass flow rate sensor element, the temperature sensor element, the moisture sensor element and/or the pressure sensor into digital output signals. As a consequence, the sensor for detecting the mass flow rate and the temperature of a fluid flow becomes more cost-effective. The analog measured values of the mass flow rate sensor element, the temperature sensor element, the moisture sensor element and/or the pressure sensor element can be supplied to the analog/digital converter by an electronic switch for the digitization process.

In the case of a next development of the invention, the sensor comprises a single interface for the power supply. As a consequence, it is possible to omit a power supply line for example between the control unit and the sensor. The sensor is therefore cheaper and reduces weight in the vehicle.

It is also possible to transmit the digitized measured values of the mass flow rate sensor element, the temperature sensor element, the moisture sensor element and/or the pressure sensor element by way of a power interface into the supply line and by way of the interface for the power supply to the motor control. Only a single interface is therefore necessary on the sensor for detecting the mass flow rate and the temperature and the interface is used both as a digital interface for transmitting signals and also as an interface for the power supply. Only a single line is necessary between the sensor for detecting the mass flow rate and the temperature and the engine control unit and the line is used both as a power supply line and also as a digital signal line.

BRIEF DESCRIPTION OF THE DRAWINGS

The invention allows numerous embodiments. The invention is further illustrated for further clarification in the drawings and is further described hereinunder. In the drawings.

DETAILED DESCRIPTION OF THE PRESENTLY PREFERRED EMBODIMENTS

Figure 1:
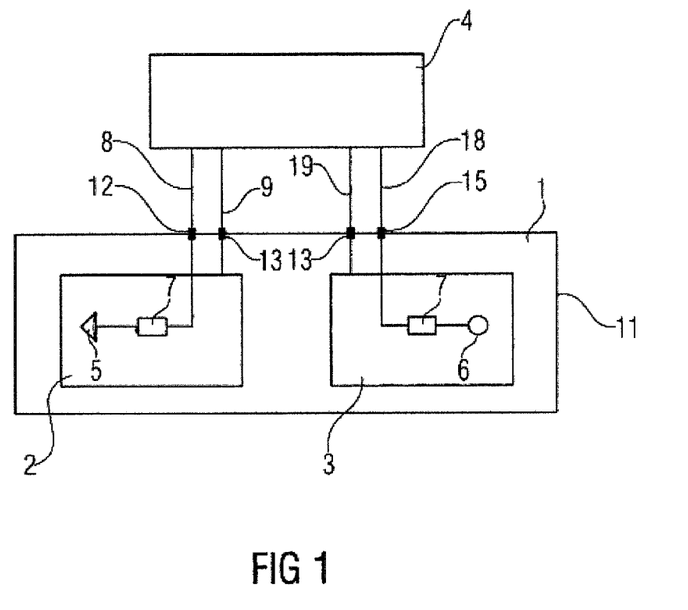
FIG. 1 shows a sensor for detecting the mass flow rate and the temperature of a fluid flow.

FIG. 1 illustrates a sensor 1 for detecting the mass flow rate and the temperature of a fluid flow. In this context, for example, a fluid flow that is conveyed in a pipe is designated as a fluid flow. The gas flow transports air in the intake tract of an automobile towards the combustion engine. It is necessary for an optimal combustion of the fuel in the combustion engine to know the exact mass flow rate of the incoming air that is to be made available for combustion purposes or that is to be supplied by way of a turbocharger. In addition, it is necessary to determine the temperature of this incoming air in order to be able to control the combustion process in the combustion engine in an optimal manner. The control of the combustion process is assumed by the engine control unit 4. The measured values of the mass flow rate sensor 2 and the temperature sensor 3 are supplied to the engine control unit 4. The mass flow rate sensor 2 and the temperature sensor 3 are components of the sensor 1 for detecting the mass flow rate and the temperature of a fluid flow. In all the embodiments, the mass flow rate sensor 2 and the temperature sensor 3 are arranged in a single housing 11 of the sensor 1 for detecting the mass flow rate and the temperature of a fluid flow. The mass flow rate sensor element 5 is evident in the mass flow rate sensor 2. A multiplicity of mass flow rate sensor elements 5 are known from the prior art, for example the heat film mass flow rate sensor element or modern micromechanically produced sensor elements for detecting a mass flow rate. The measured values for the mass flow rate of the fluid flow are provided in analog form by the mass flow rate sensor element 5. Since analog signals are generally very prone to interference, the analog signal is converted into a digital signal directly behind the mass flow rate sensor element 5. The conversion is performed with a so-called analog/digital converter 7. The analog/digital converter 7 sends the digital signal that is proportional to the mass flow rate of the fluid to a digital interface 12 of the sensor 1 for detecting the mass flow rate and the temperature of a fluid flow. The digitized signal of the mass flow rate sensor element 5 is transmitted from the digital interface 12 by way of a signal line 8 to the engine control unit 4. The engine control unit 4 can also provide the supply power for the mass flow rate sensor 2 by way of the supply power line 9 and the interface 13 for the power supply to the mass flow rate sensor 2.

In addition, FIG. 1 illustrates the temperature sensor 3 in the housing 11 of the sensor 1 for detecting the mass flow rate and the temperature of a fluid flow. The temperature sensor 3 comprises a temperature sensor element 6. The temperature sensor element 6 also provides analog signals that are further supplied to the engine control unit 4 with the aid of a second interface 15 and a second signal line 18. The engine control unit 4 can also provide the supply power for the temperature sensor 3 by way of a second power supply line 19 and an interface 13 for the power supply to the temperature sensor 3. It is clearly evident that the sensor 1 for detecting the mass flow rate and the temperature of a fluid flow in FIG. 1 comprises two interfaces 12, 15 for the signals and two interfaces 13 for the power supply of the sensor 1 for detecting the mass flow rate and the temperature of a fluid flow and also two signal lines 8, 18 and two power supply lines 9, 19.

Figure 2:
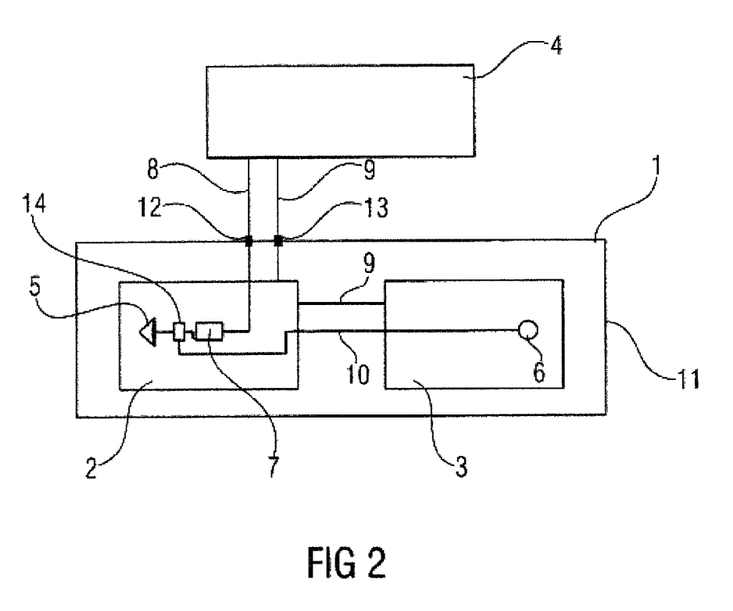
FIG. 2 shows a further sensor for detecting the mass flow rate and the temperature of a fluid flow.

FIG. 2 illustrates a sensor 1 for detecting the mass flow rate and the temperature of a fluid flow having a single interface 13 for the power supply, wherein the sensor comprises a mass flow rate sensor 2 having a mass flow rate sensor element 5 and a temperature sensor 3 having a temperature sensor element 6. The sensor 1 detects the measured values that are generated in analog form by the mass flow rate sensor element 5 and the temperature sensor element 6 and converts them into digital output signals. The digital output signals are provided at a single digital interface 12. In this example, the sensor comprises only a single analog/digital converter 7 that converts both the analog measured values of the mass flow rate sensor element 5 as well as the analog measured values of the temperature sensor element 6 into a digital output signal and provides the output signal at a single digital interface 12. The digital output signals are then transmitted by way of a single signal line 8 to the motor control 4.

In FIG. 2, the analog/digital converter 7 is arranged in the mass flow rate sensor 2. The signal of the temperature sensor 3 is conveyed by the temperature sensor element 6 to a switch 14 that in this case is arranged, by way of example, in the mass flow rate sensor 2 and that transmits either the signals of the temperature sensor element 6 or the signals of the mass flow rate sensor element 5 to the analog/digital converter 7. This switch 14 is generally embodied as an electronic switch on the ASIC (application specific integrated circuit) of the sensor 1. The digital temperature signal and the digital mass flow rate signal are supplied along the signal line 8 to the engine control unit 4 by way of the single digital interface 12 of the sensor 1 for detecting the mass flow rate and the temperature of a fluid flow. The engine control unit 4 can further supply by way of a single supply line 9 a supply power to the single interface 13 for the power supply of the sensor 1 for detecting the mass flow rate and the temperature of the fluid flow and the supply power supplies the mass flow rate sensor 2 and also the temperature sensor 3 with electrical energy. The power supply line 9 is routed within the sensor 1 for detecting the mass flow rate and the temperature of the fluid flow so that the temperature sensor 3 is also supplied with a supply power.

With respect to the arrangement according to FIG. 1, this arrangement omits both the second interface 15 for the signals of the temperature sensor and also an interface 13 for the power supply whereby both the second signal line 18 and also the second power supply line 19 can be omitted. In addition, only a single analog/digital converter 7 is present in the sensor 1 for detecting the mass flow rate and the temperature of a fluid flow and the converter converts both the analog signals and measured values of the mass flow rate sensor element 5 and also the temperature sensor element 6 into digital output values and provides the digital output values at the single digital interface 12.

Figure 3:
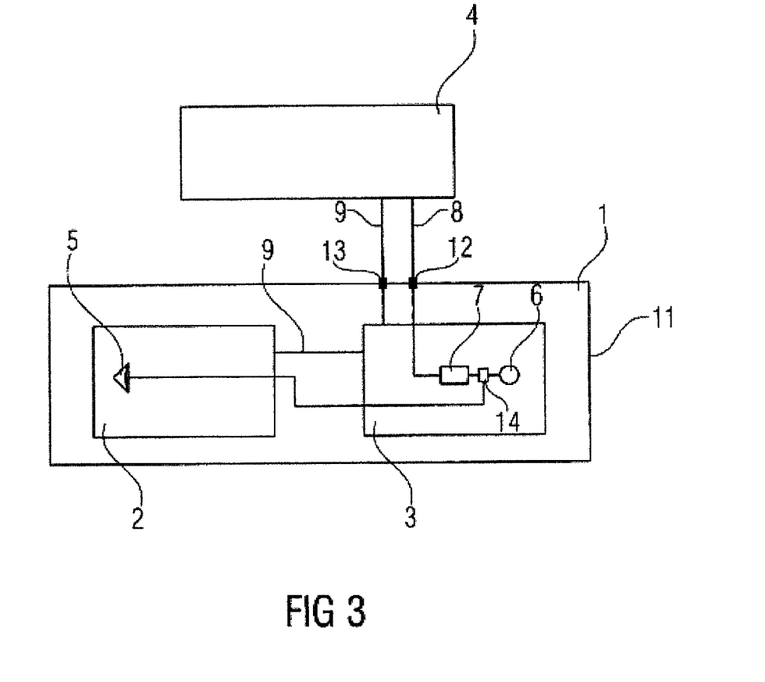
FIG. 3 shows a third sensor for detecting the mass flow rate and the temperature of a fluid flow.

FIG. 3 likewise illustrates a sensor 1 for detecting the mass flow rate and the temperature of the fluid flow. A mass flow rate sensor 2 and a temperature sensor 3 are evident in the sensor 1. The mass flow rate sensor element 5 is located in the mass flow rate sensor 2 and the mass flow rate sensor element supplies the analog measured values, which are generated by the mass flow rate sensor, to an electronic switch 14 by way of a line and the electronic switch transmits either the measured values of the temperature sensor element 6 or the mass flow rate sensor element 5 to the analog/digital converter 7. The analog/digital converter 7 is arranged in the temperature sensor 3. In turn, the sensor 1 for detecting the mass flow rate and the temperature of a fluid flow comprises only a single analog/digital converter that supplies both the analog signals of the mass flow rate sensor element 5 and also the analog signals of the temperature sensor element 6 in digital signal form to the single digital interface 12. The supply power line 9 leads in turn from the engine control unit 4 to the single interface 13 for the power supply that supplies both the temperature sensor 3 and also the mass flow rate sensor 2 with an operating power and therefore with electrical energy. It is also evident in this case that with respect to the embodiment in FIG. 1, it is possible to omit at least one digital interface and at least one interface 13 for the power supply of the sensor 1. The sensors according to FIGS. 2 and 3 can therefore be produced in a simpler and more cost-effective manner than the sensor 1 [illustrated in FIG. 1] for detecting the mass flow rate and the temperature of a fluid flow.

Figure 4:
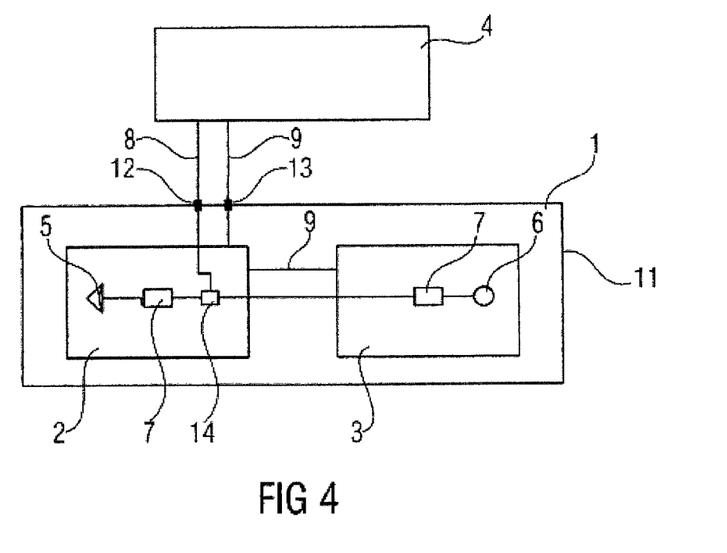
FIG. 4 shows a further embodiment of the sensor for detecting the mass flow rate and the temperature of a fluid flow.

FIG. 4 illustrates a further embodiment of the sensor for detecting the mass flow rate and the temperature of a fluid flow. The mass flow rate sensor 2 and the temperature sensor 3 are in turn evident in the sensor 1. The mass flow rate sensor 2 comprises a mass flow rate sensor element 5 whose analog measured values are digitized by an analog/digital converter 7. The digitized measured values of the mass flow rate sensor element 5 are transmitted to the single digital interface 12 of the sensor 1 by the analog/digital converter 7. The digitized signals of the mass flow rate sensor element 5 are transmitted to the engine control unit 4 by the single digital interface 12 by way of the single signal line 8. In addition, the sensor for detecting the mass flow rate and the temperature comprises a temperature sensor 3 having a temperature sensor element 6. An analog/digital converter 7 is located in the temperature sensor 3 and the analog/digital converter converts the analog measured values of the temperature sensor element 6 into digital measured values. It is possible, with the aid of the switch 14 that is generally embodied as an electronic switch, to determine which digitized measured values are to be transmitted to the single interface 12. The switch 14 can, for example, be controlled such that generally the mass flow rate sensor element 5 transmits digitized measured values to the single digital interface 12 and, for example, this transmission process is interrupted every second so that the measured values that are recorded and digitized by the temperature sensor element 6 can be transmitted to the single digital interface 12. The transmission of the measured values of the temperature sensor element 6 is performed in a very small time frame so that the almost continuous process of measuring of the mass flow rate by the mass flow rate sensor element 5 is only disturbed to an insignificant degree. Furthermore, it is to be noted that the sensor for detecting the mass flow rate and the temperature of a fluid flow comprises only one single interface 13 for the power supply, as a result of which only one single power supply line 9 is required.

Figure 5:
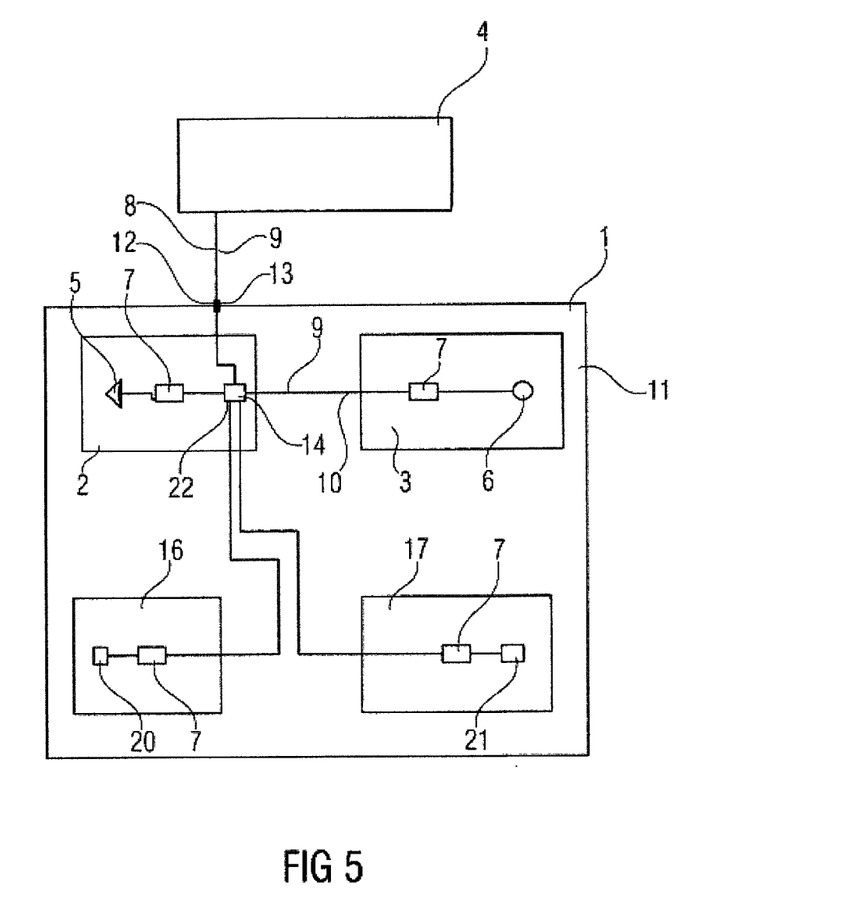
FIG. 5 shows a sensor for detecting the mass flow rate and the temperature of a fluid flow and the sensor is further equipped with a moisture sensor and a pressure sensor.

FIG. 5 illustrates a sensor 1 for detecting the mass flow rate and the temperature, the sensor having an additional pressure sensor 17 and an additional moisture sensor 16. In the case of detecting the mass flow rate in the intake tract of an internal combustion engine, it is extremely useful in addition to the measurement of the mass flow rate itself also to obtain information about the temperature that is prevailing in the mass flow, the air moisture in the mass flow and/or the pressure of the mass flow. The ultimately essential measurement for the purpose of controlling an internal combustion engine is the amount of oxygen introduced in the combustion chambers. This amount of oxygen is obviously fundamentally dependent upon the mass flow rate. However, the amount of oxygen is also influenced by the temperature in the mass flow, the pressure under which the mass flow is being conveyed and the air moisture in the mass flow. It is therefore advantageous to integrate a mass flow rate sensor 2, a temperature sensor 3, a moisture sensor 16 and a pressure sensor 17 in a single housing 11 in the sensor for detecting the mass flow rate and the temperature of a fluid flow. The mass flow rate sensor 2 comprises a mass flow rate sensor element 5 whose measurement signals are digitized by an analog/digital converter 7. The temperature sensor 3 comprises a temperature sensor element 6 whose measured values are digitized by an analog/digital converter 7. The moisture sensor 16 comprises a moisture sensor element 20 whose measurement results are digitized by an analog/digital converter 7. The pressure sensor 17 comprises a pressure sensor element 21 whose measured values are digitized by an analog/digital converter 7. The digitized measured values of the mass flow rate sensor element 5, temperature sensor element 6, moisture sensor element 20 and the pressure sensor element 21 are transmitted to a switch 14 with the aid of which it is determined which of the digitized signals is transmitted to the engine control unit 4 at the respective time. The switch is furthermore embodied as a so-called power interface 22 with which it is possible to transmit to the engine control unit 4 the digitized signals of the mass flow rate sensor element 5, the temperature sensor element 6, the moisture sensor element 20 and/or the pressure sensor element 21 by way of the interface 13 to the power supply, and the interface is simultaneously used as a digital interface 12 along the power supply line 9 that is simultaneously used as a signal line. The sensor for detecting the mass flow rate and the temperature of a fluid flow therefore only comprises a single interface that is used as a single digital interface 12 and as a single interface 13 for the power supply. Only one line is necessary between the engine control unit 4 and the sensor for detecting the mass flow rate and the temperature of a fluid flow and said line is used as a digital signal line 8 and as a power supply line 9. The sensor for detecting the mass flow rate and the temperature can transmit to the motor control 4 measured values of the mass flow rate, the temperature, the air moisture in the mass flow and/or the pressure that is prevailing in the mass flow.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A sensor (1) for detecting the mass flow rate and the temperature of a fluid flow, comprising:
   a power supply;
   a mass flow rate sensor (2) having a mass flow rate sensor element (5) configured to generate analog measured values;
   a temperature sensor (3) having a temperature sensor element (6) configured to generate an analog measured value;
   an interface (13) for the power supply; and
   at least one analog/digital converter (7) configured to convert the analog measured values of the mass flow rate sensor element (5) and/or the analog measured value of the temperature sensor element (6) into digital output signals and provide the digital output signals at a single digital interface (12).

2. The sensor (1) as claimed in claim 1, further comprising a moisture sensor having moisture sensor element and/or a pressure sensor having a pressure sensor element.

3. The sensor (1) as claimed in claim 1, wherein the at least one analog/digital converter (7) is arranged in the mass flow rate sensor (5).

4. The sensor (1) as claimed in claim 1, wherein the at least one analog/digital converter (7) is arranged in the temperature sensor (3).

5. The sensor (1) as claimed in claim 2, wherein the at least one analog/digital converter (7) is arranged in the moisture sensor (16).

6. The sensor (1) as claimed in claim 2, wherein the at least one analog/digital converter (7) is arranged in the pressure sensor (17).

7. The sensor (1) as claimed in claim 1, wherein the interface (13) is a single interface (13) for the power supply.

8. The sensor (1) as claimed in claim 2, wherein the analog/digital converter (7), the mass flow rate sensor (5) and the temperature sensor (3) and/or the moisture sensor and/or the pressure sensor are arranged on a single substrate and said single substrate comprises the single digital interface (12).

9. The sensor (1) for as claimed in claim 2, further comprising a power interface (22), wherein the digitized measured values of the mass flow rate sensor element (5), the temperature sensor element (6), the moisture sensor element (20) and/or the pressure sensor element (21) are transmittable by way of the power interface (22) into the power supply line (9) and by way of the interface (13) for the power supply to a motor control (4).

* * * * *